United States Patent
Atkin et al.

[19]

[11] Patent Number: 6,053,198

[45] Date of Patent: Apr. 25, 2000

[54] SOLENOID VALVE CONTROL SYSTEM

[75] Inventors: Bradly J. Atkin, Commerce Township; Dennis L. Bonacorsi, Howell; Donald E. McGeachy, Commerce Township, all of Mich.; William S. Smith, Scottsdale, Ariz.

[73] Assignee: Numatics, Incorporated, Highland, Mich.

[21] Appl. No.: 08/980,668

[22] Filed: Dec. 1, 1997

[51] Int. Cl.[7] .............................. F16K 11/10; F16K 31/02; F16K 43/00

[52] U.S. Cl. .......................... 137/315; 137/271; 137/551; 137/554; 137/884

[58] Field of Search ...................................... 137/269, 270, 137/271, 315, 560, 596.16, 596.17, 596.18, 625.64, 884, 551, 554; 251/129.01, 129.15

[56] References Cited

U.S. PATENT DOCUMENTS

| | | | |
|---|---|---|---|
| 4,815,496 | 3/1989 | Nishitani et al. | 137/884 |
| 4,889,164 | 12/1989 | Hozumi et al. | 137/884 |
| 5,522,431 | 6/1996 | Bonacorsi et al. | 137/884 |
| 5,706,858 | 1/1998 | Miyazoe et al. | 137/270 |
| 5,884,664 | 3/1999 | Nagai et al. | 137/884 |
| 5,915,666 | 6/1999 | Hayashi et al. | 137/884 |
| 5,918,629 | 7/1999 | Hayashi et al. | 137/884 |

*Primary Examiner*—George L. Walton
*Attorney, Agent, or Firm*—Reising, Ethington, Barnes, Kisselle, Learman & McCulloch, P.C.

[57] ABSTRACT

A fluid control system that includes a fluid manifold having a plurality of manifold bodies fastened to each other end-to-end so as to form at least first and second passages extending continuously through the manifold and each of the bodies. A plurality of solenoid valves are each mounted on a side of an associated body with valve ports opening into the body to the fluid passage(s) that extend through the manifold. An electrical connection arrangement is mounted at one end of the manifold for receiving control signals from an external source. A plurality of circuitboards are disposed one within the second passage of each body, with each of the circuitboards including male and female connectors at opposed ends for connecting the circuitboards in series with each other to the electrical connection arrangement at the end of the manifold. A third connector on each circuitboard extends laterally from the circuitboard for connection to the solenoid valve mounted on the side of the associated manifold body.

39 Claims, 10 Drawing Sheets

SOLENOID VALVE CONTROL SYSTEM

The present invention is directed to solenoid-actuated fluid control valves, and more particularly to an electronic system for actuating and controlling solenoid valves. Yet more specifically, the present invention relates to improvements in the solenoid valve control system disclosed in U.S. Pat. No. 5,522,431, assigned to the assignee hereof.

BACKGROUND AND SUMMARY OF THE INVENTION

Solenoid valve systems for controlling flow of hydraulic or pneumatic fluid have been used in automated manufacturing equipment, production lines and numerous industrial applications. A plurality of solenoid valves typically are mounted on a manifold having a plurality of passages for supplying fluid to the valves and providing passages for connecting fluid couplings to various outlet ports of each valve. Each solenoid of each valve typically is separately electrically wired to an electronic system for controlling operation of the several solenoids and valves. The controller may be located at a position remote from the manifold assembly, requiring a multiplicity of extended conductor lengths for individual connection to the valve solenoids.

U.S. Pat. No. 5,522,431 discloses an improved solenoid valve manifold system in which each solenoid is mounted on one side face of a manifold module. The several modules are mounted end-to-end to form a manifold with interconnected through-passages for feeding fluid to and from the several valves. Each manifold module has a terminal block and valve control electronics for hard-wire connection to input/output connectors at the ends of the manifold, and for connection to the associated valve solenoid(s). Although the modular manifold system so disclosed addresses and overcomes problems theretofore extant in the art, further improvements remain desirable. In particular, the manifold system disclosed in the noted patent requires extensive interconnection by hard-wiring, greatly increasing the cost and complexity of manufacture, field installation and repair.

It is therefore a general object of the present invention to provide a solenoid valve control system that is constructed of interchangeable modular components, that is readily adapted for use in a variety of applications having differing input and output requirements and specifications, and that requires little or no hard-wiring within the modular manifold itself. Another and related object of the present invention is to provide a solenoid valve fluid control system of the described character that is versatile in design, and economical to assemble, install and repair.

A fluid control system in accordance with the present invention includes a fluid manifold having a plurality of manifold bodies fastened to each other end-to-end so as to form one or more fluid passages extending through the manifold. A solenoid valve is mounted on a side of at least one of the manifold bodies with fluid ports opening into the manifold body to the fluid passages extending therethrough. An electrical input/output connection is mounted at one end of the manifold for receiving control signals from an external source. A circuitboard arrangement extends within the manifold from the input/output connection and has conductors printed thereon for connecting the input/output connection to the solenoids of the various valves.

Each of the manifold bodies in the preferred embodiments of the invention includes a passage that extends in assembly through the entire manifold offset from the fluid passages and through which the circuitboard arrangement extends for connection to the various solenoid valves. Both the circuitboard passage and the fluid passages comprise through-passage segments in each of the manifold bodies that align with each other when the bodies are assembled end-to-end to form the manifold. The circuitboard arrangement preferably comprises a plurality of individual circuitboards disposed one within each of the manifold bodies, the various circuitboards being electrically interconnected in series. Each of the circuitboards includes complimentary male and female electrical connectors at opposed ends for connecting the boards in series, and a third connector along one lateral side disposed in assembly adjacent to the side of the manifold body on which the solenoid valve is mounted for making electrical connection from the circuitboard to the valve solenoid. This electrical interconnection is made through an opening in the side of the manifold body that is sealed by the electrical interconnection to the valve solenoid. The circuitboards in the preferred embodiments of the invention are provided in two forms, one providing a single output for lateral connection to a single-solenoid valve, and the other providing dual outputs for lateral connection to a dual-solenoid valve. The conductors printed on the circuitboards are arranged such that the output or outputs to the solenoid valve are always taken from the same connection terminal(s) at the upstream connector, with the remaining connector terminals being interconnected in such a way that the control signals for the remaining solenoid valves on the manifold are sequentially presented at the selected terminal (s) of the connectors.

The solenoid valves in the preferred embodiments of the invention comprise a valve body having a spool for selectively controlling flow of fluid through the valve body from and to the manifold, and from and to the output ports on each manifold body. A solenoid is mounted on one end of the valve body, and has an actuator operatively coupled to the valve spool. A valve control circuitboard is sandwiched between the solenoid and the valve body. The valve circuitboard has a first valve connector for interconnection with the third connector on the circuitboard in the underlying manifold body, and a second connector for connection to the coil of the solenoid in such a way that mounting of the solenoid onto the valve body automatically implements electrical connection to the valve control circuitboard. In implementations in which dual-solenoid valves are employed, with solenoids being mounted on opposed ends of the valve body, a solenoid interconnection extends through the valve body at a position offset from the valve spool for interconnecting the second solenoid with the solenoid control circuitboard. Fluid control means, such as a pressure regulator or a velocity controller, may be mounted between the solenoid valve and the corresponding manifold body side face. Electrical connection between the third connector of the circuitboard within the manifold body and the solenoid control board sandwiched between the solenoid and the valve body is made by a valve interconnection circuitboard that extends through the fluid controller.

The manifold bodies carry screws for releasably fastening the manifold bodies end-to-end to form the manifold assembly. These screws have an externally threaded male end and an internally threaded female end for receiving the male end of a screw in the adjacent manifold body. The screws have a central portion of reduced diameter that is captured by a web within the manifold body. The manifold bodies preferably are of identical construction, and the manifold body assemblies preferably are provided in two forms, one for use in conjunction with a single-solenoid valve and the other for use in conjunction with a dual-solenoid valve. The third connectors on the circuitboards for making connection to the valve solenoids preferably are color-coded to distinguish between single-solenoid and dual-solenoid manifold bodies.

The electrical input/output connection at one end of the manifold preferably comprises an input/output circuitboard assembly contained within an appropriate end housing assembly. These end housing assemblies may be provided in differing forms having standardized input/output connectors and/or standardized communication protocol. The input/output circuitry may include valve drivers for supplying valve control signals to the valve solenoids by means of the series-connected circuitboards within each of the several manifold bodies.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

FIGS. 1–14 illustrate a fluid control system 30 in accordance with a presently preferred embodiment of the invention as comprising a unitary manifold assembly 32. A plurality of identical manifold bodies 34 each have machined end faces 34a, 34b that are disposed in spaced parallel planes. Fluid passages 36, 38, 40 extend through each manifold body 34 between the end faces and, in assembly of several manifold bodies 34 to form manifold 32, extend longitudinally end-to-end through the manifold assembly. Ports 36a, 38a, 40a (FIGS. 2 and 3A) on a side face 34c of manifold body 34 open respectively into fluid passages 36, 38, 40. Return ports on side face 34c of manifold body 34 are internally coupled to outlet ports 41, 42 on the manifold body. A pair of screws 44 are captured within each manifold body 34 at positions on opposed sides of fluid passages 36, 38, 40. Each screw 44 includes an externally threaded male end 46, and an internally threaded female end 48 interconnected by a shank 50 of reduced diameter. End 48 contains a slot 52 for receiving the head of a screwdriver or the like. Male screw end 46 is self-tapping and threaded through a web 54 in manifold body 34, so that following such self-tapping insertion through web 54, screw 44 is effectively captured in assembly by web 54. The spaced screws 44 in the several manifold bodies 34 are employed to assemble the manifold bodies end-to-end to form unitary manifold assembly 32. A gasket 56 extends around one end face 34b of each manifold body 34 for sealing fluid passages 36, 38, 40 from each other and from the external atmosphere.

Figure 6A:
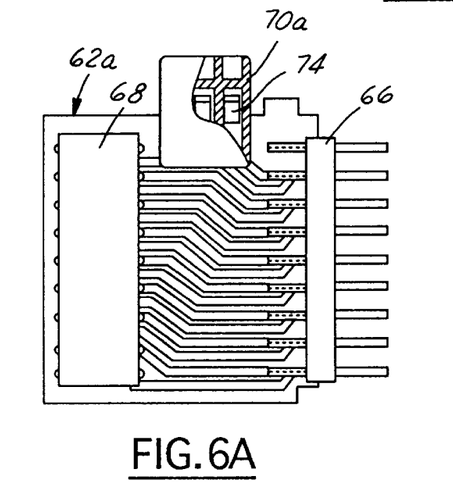
FIGS. 6A and 6B illustrate a manifold interconnection circuitboard for a dual-solenoid valve in the system of FIG. 1.
Figure 6B:
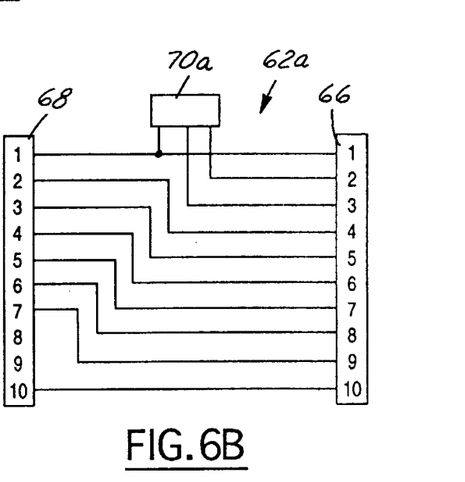
Figure 7A:
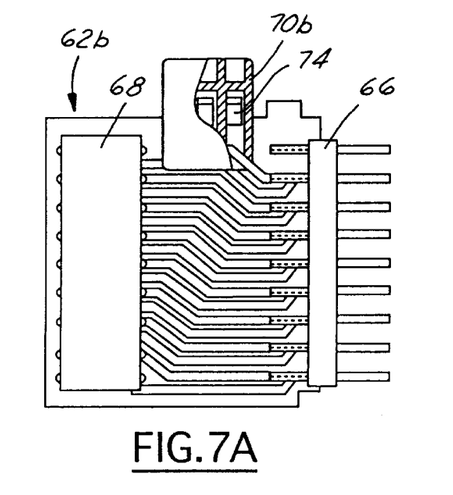
FIGS. 7A and 7B illustrate a manifold interconnection circuitboard for a single-solenoid valve in the system of FIG. 1.
Figure 7B:
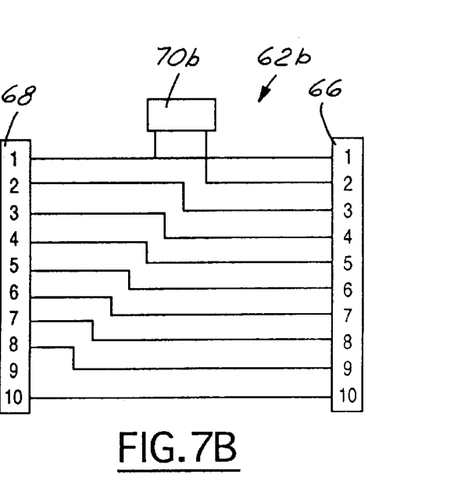

A passage 60, which is laterally offset from fluid passages 36, 38, 40 and screws 44, extends end-to-end through each manifold body 34 so as to form a continuous passage that extends end-to-end through the manifold assembly when the manifold bodies are assembled to each other. A circuitboard assembly 62 is received within passage 60 by sliding fit of the circuitboard side edges into opposed slots 64 that extend partway through passage 60. Circuitboard assembly 62 preferably is provided in two forms: assembly 62a illustrated in FIGS. 6A and 6B, and assembly 62b illustrated in FIGS. 7A and 7B. The purposes of these two circuitboard forms or configurations will be explained later. Each circuitboard assembly 62 has a male connector 66 disposed at one end and a female connector 68 disposed at the opposing end, with the connectors 66, 68 being of complimentary mating configuration so that the circuitboard assemblies 62 disposed within the several manifold bodies 34 may be connected in series end-to-end as the manifold bodies are assembled to each other. A third connector 70 extends from one lateral side of each circuitboard assembly 62 through an opening 72 in side face 34c of manifold body 34. The contacts of connectors 66, 68 are connected to each other by conductors printed on circuitboard assembly 62, as best seen in FIGS. 6A and 7A. Selected contacts of connector 66 are also connected to the contacts of connector 70, for purposes to be described. In assembly, the female duck-bill contacts 74 of connector 70 are assembled to circuitboard 62 (see FIG. 3A) and the circuitboard assembly is then slid into slots 64 of passage 60. The body of connector 70 is then inserted through opening 72 in manifold body 34 to protect the contacts 74, and to fasten circuitboard assembly 62 in position within the manifold body. Connector 70 preferably is color-coded in embodiments 70a and 70b so as to distinguish between the circuitboard assembly constructions 62a, 62b of FIGS. 6A and 7A.

Figure 1:
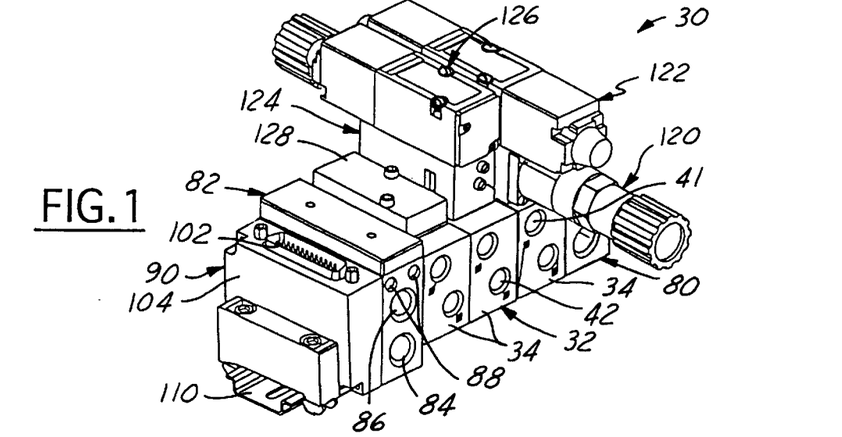
FIG. 1 is a perspective view of a fluid control system in accordance with one presently preferred embodiment of the invention.
Figure 2:
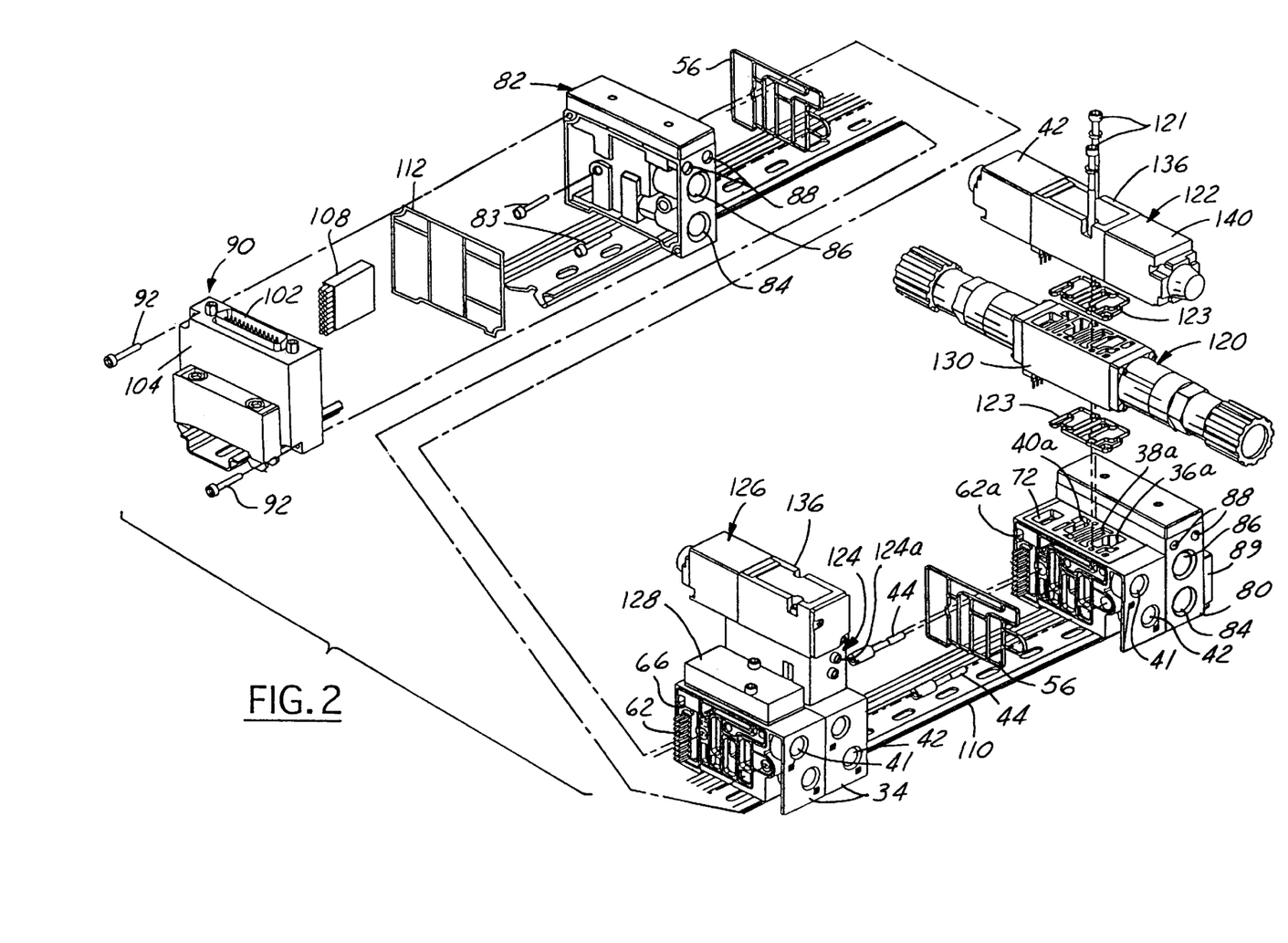
FIG. 2 is an exploded perspective view of the fluid control system illustrated in FIG. 1.
Figure 3:
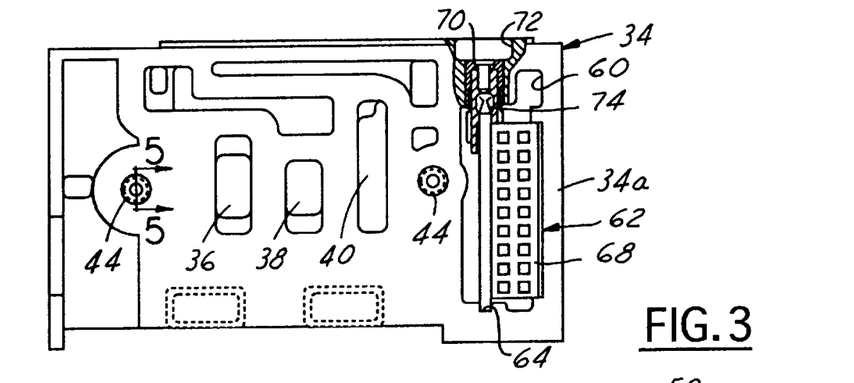
FIG. 3 is an end elevational view of a manifold body assembly in the system of FIG. 1.
Figure 3A:
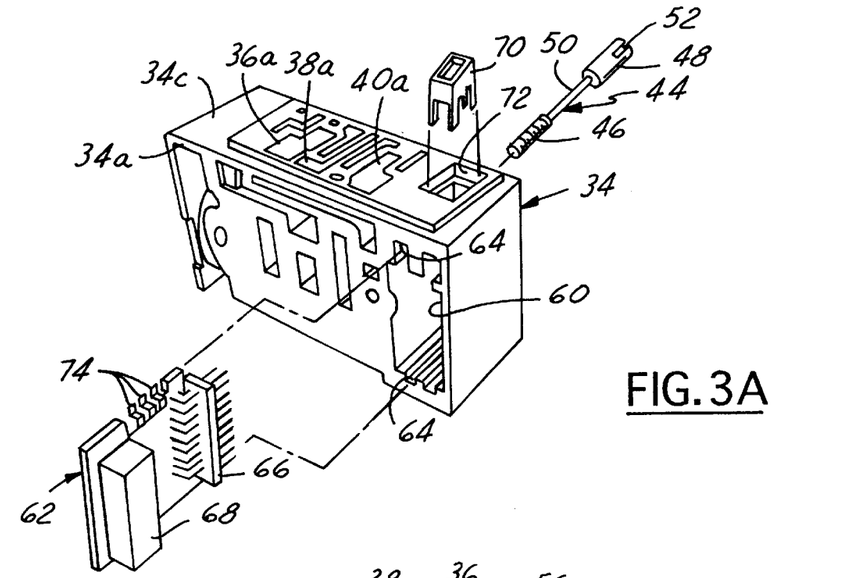
FIG. 3A is an exploded perspective view of the assembly illustrated in FIG. 3.
Figure 4:
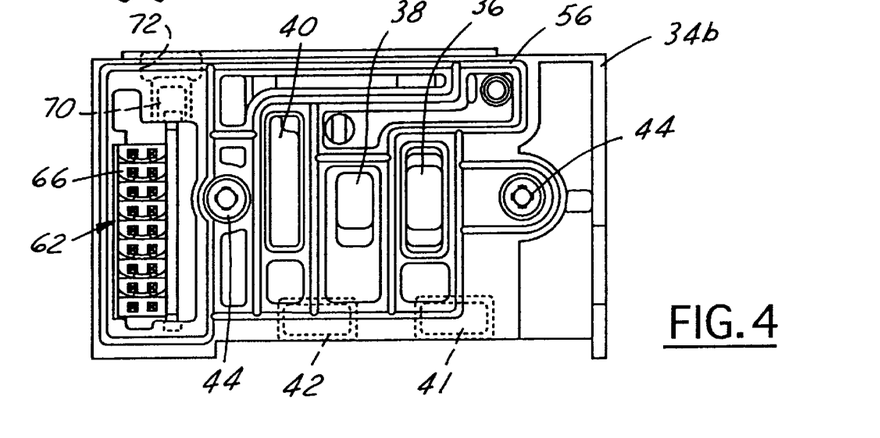
FIG. 4 is an opposing end elevational view of the assembly illustrated in FIG. 3.
Figure 5:
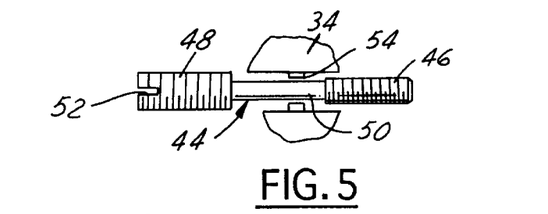
FIG. 5 is a fragmentary sectional view taken substantially along the line 5—5 of FIG. 3.

FIGS. 1 and 2 illustrate manifold assembly 32 as comprising three manifold body sub-assemblies 34 assembled to each other end-to-end between a pair of end plate assemblies 80, 82. End plate assemblies 80, 82 close the ends of fluid passages 36, 38, 40 and provide ports 84, 86 for external fluid connection to the fluid passages. The end plate assemblies also have pilot supply ports 88. A plate 89 (FIG. 2) closes end plate assembly 80. End plate assembly 80 is fastened to the adjacent manifold boy 34 by screws 44, and end plate assembly 82 is fastened to the adjacent manifold body 34 by screws 83 received in heads 48 of screws 44 in that manifold body. An end housing assembly 90 is mounted by screws 92 to end plate assembly 82. End housing assembly 90 includes an input/output circuitboard assembly 100 (FIG. 14), which may be provided in several forms, as will be described. The particular circuitboard assembly 100 illustrated in FIG. 14 has an input/output connector 102 mounted along one side edge for exposure through an opening in the housing 104 of housing assembly 90. The contacts of connector 102 are connected by conductors printed on circuitboard 100 to the contacts of a second connector 106 disposed on circuitboard assembly 100 for longitudinal alignment with circuitboards 62 within manifold bodies 34. The number and configuration of contacts in connector 106 is the same as in connectors 66, 68 of circuitboards 62. A transfer connector 108 (FIG. 2) connects connector 106 to the connector 66 of the first circuitboard assembly 62 in the first manifold body 34. Thus, input connector 102 is effectively connected by circuitboard 100, connector 106 and transfer connector 108 to the several manifold body circuitboards 62 in series. Manifold 32 is shown in FIGS. 1 and 2 as being mounted on a standard DIN mounting rail 110. A gasket 112 is disposed between end plate assembly 82 and end housing assembly 90.

In the embodiment illustrated in FIGS. 1–14, three manifold bodies 34 are shown. Beginning from the right end in FIGS. 1 and 2, the first manifold body is coupled through a dual pressure regulator 120 to a dual-solenoid valve 122. The second manifold body 34 is connected through a speed control module 124 to a single-solenoid valve 126. The third manifold body 34 is unused, with the ports on the upper side face being covered by a blank station plate 128. At each of the valved manifold bodies, the supply and return ports, to which fluid passage is controlled by the solenoid valve, are disposed at 40, 42 on a side face of the manifold body, and may also open to the side face opposite to which the valve is mounted. The manifold station containing dual pressure regulator 120 and dual-solenoid valve 122 is illustrated in greater detail in FIGS. 8–12A. Valve 122 and pressure regulator 120 are mounted to manifold body 34 by screws 121, with gaskets 123 being disposed between each body. Dual pressure regulator 120 has a body 130 through which passages extend between the side face ports of manifold body 34 and the supply, return and controlled ports of valve 122. A valve connector assembly 132 extends through a passage 134 in body 130 of regulator 120 from connector 70a of manifold body 34 to provide control signals to the overlying solenoid valve 122. Solenoid valve 122 includes a valve body 136 within which a valve spool 138 is slidably disposed for providing controlled fluid communication between input/output and exhaust ports on the valve body. A pair of solenoids 140, 142 are mounted on the opposed ends of valve body 136. Each solenoid 140, 142 includes a coil 144 and an armature 146 in respective abutting engagement with an associated end of spool 138. To provide electrical connection to the coils 144 of solenoids 140, 142, a solenoid control circuitboard assembly 150 is sandwiched in assembly between solenoid 140 and the opposing end of valve body 136. Solenoid control board assembly 150 has a pair of female duck-bill contacts 152 that are positioned for mating engagement with male contacts on solenoid 140 as solenoid 140 is fastened to valve body 136 with board 150 sandwiched therebetween.

Figure 8:
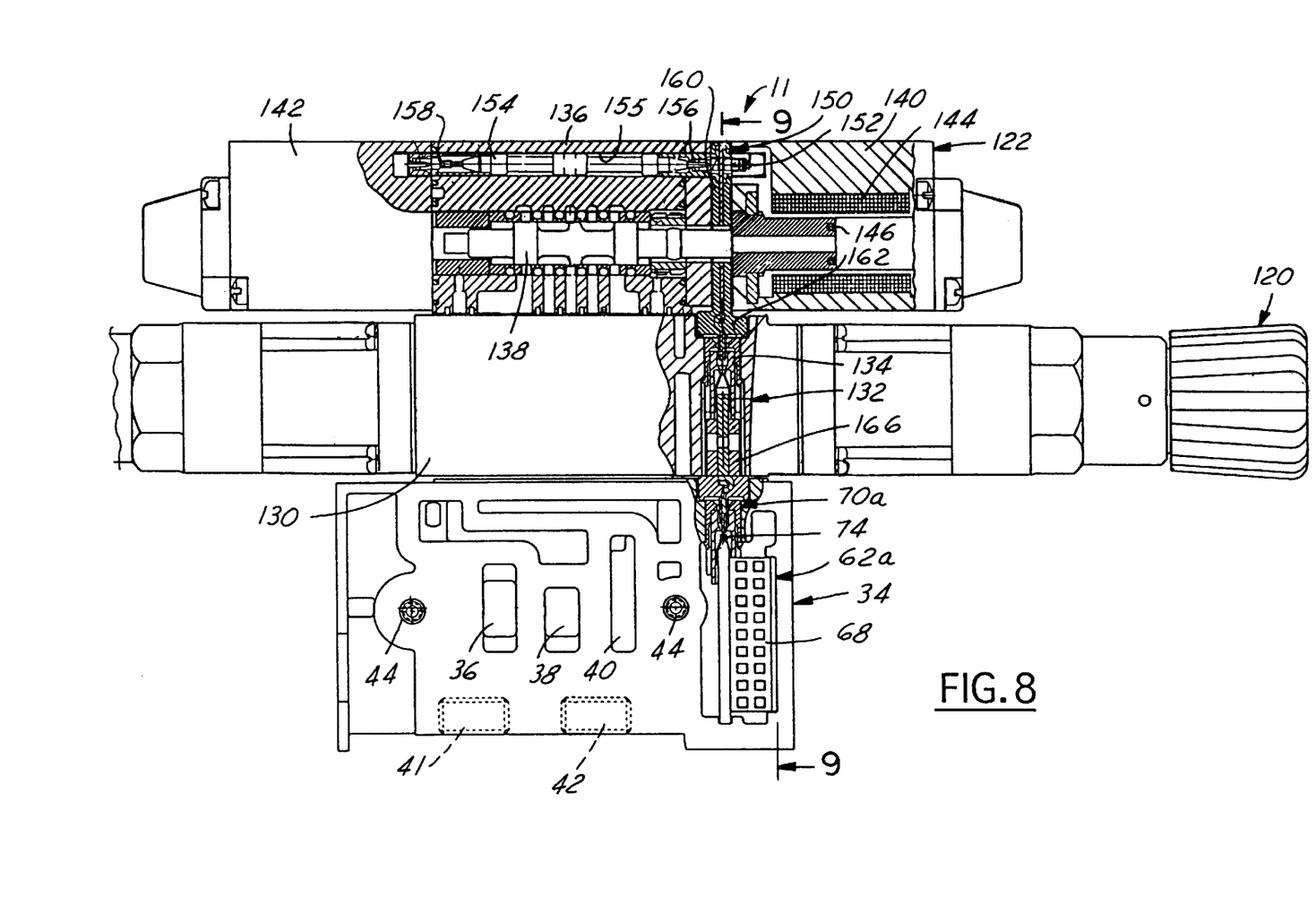
FIG. 8 is a fragmentary partially sectioned view of a manifold body assembly, pressure regulator and dual-solenoid valve in the system of FIG. 1.

A solenoid interconnector 154 extends through a passage 155 in valve body 136 offset from spool 138. Interconnector 154 has a pair of spaced parallel male contacts 156 at one end that are slidably received within associated female duck-bill contacts on solenoid control board 150 as solenoid 140 is mounted to valve body 136. The opposing end of interconnector 154 carries a pair of female duck-bill contacts 158 that slidably receive the male contacts of solenoid 142 as solenoid 142 is mounted on the opposing end of valve body 36. Solenoid control board 150 comprises a circuitboard 160 on which contacts 152 are mounted. Conductors printed on circuitboard 160 connect contacts 152 to a three-terminal male connector 162 on one edge of circuitboard 160. Connector 162 is removably received in a female connector 164 on circuitboard 132 as solenoid valve assembly 122 is mounted on pressure regulator 120. Circuitboard assembly 132 has printed conductors that connect the three terminals of connector 164 to the three male contacts of connector 166, which is received in mating engagement with connector 70a on circuitboard 62a as pressure regulator 120 is mounted on manifold body 34. Circuitboard assembly 150 also carries a pair of LED's 168, 170 for indicating when the associated solenoids are energized. Connectors 162, 166 are of identical contact configuration, so that solenoid control board 150 may be plugged directly into connector 70a (or 70b) in applications where pressure regulator 120 (or other intervening control) is not used.

Figures 9, 10, 11:
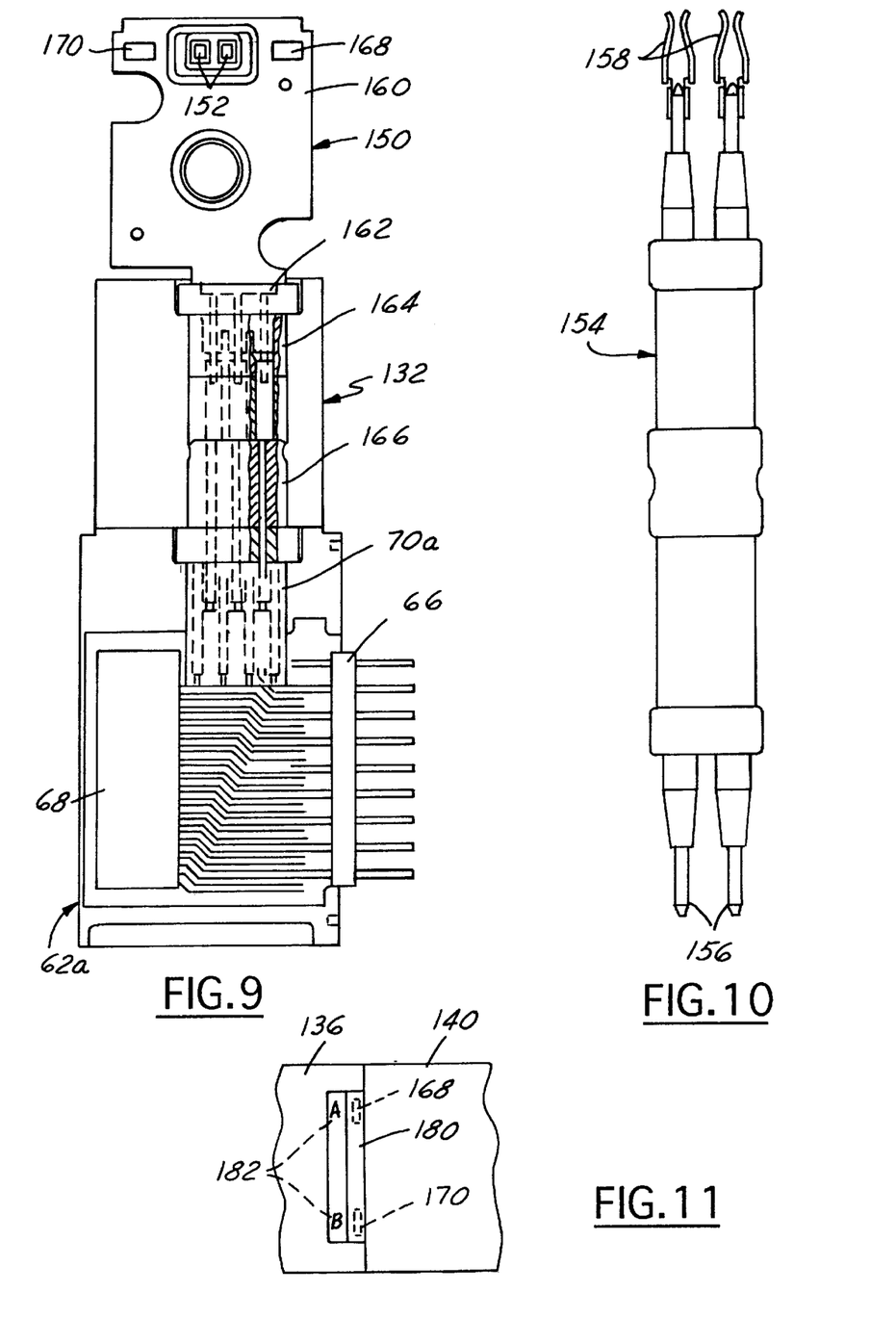
FIG. 9 is an elevational view of the manifold body/pressure regulator/solenoid valve interconnection in FIG. 8, being taken substantially along the line 9—9 in FIG. 8.
FIG. 10 is a plan view of the solenoid interconnection in FIG. 8.
FIG. 11 is a fragmentary plan view taken substantially from the direction 11 in FIG. 8.
Figure 12:
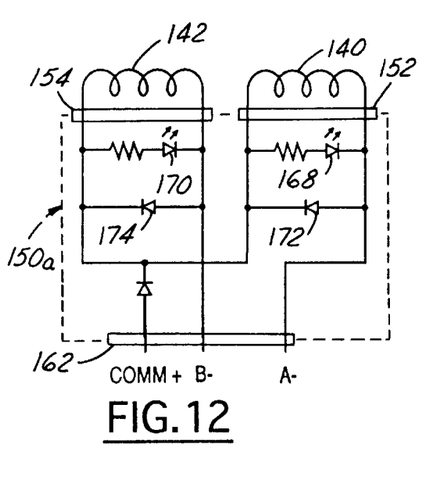
FIGS. 12 and 12A are electrical schematic diagrams that illustrate interconnection to the solenoids of a dual-solenoid valve for d.c. and a.c. control respectively.
Figure 12A:
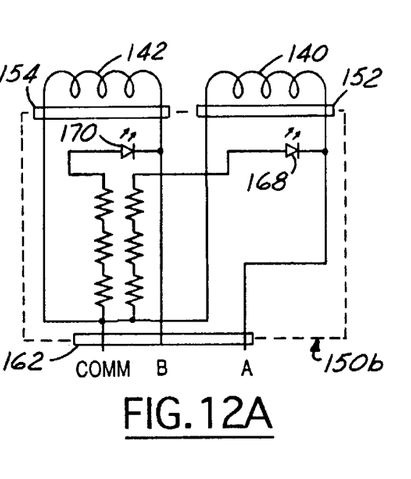

Valve control circuitboard 150 preferably is provided in two forms 150a and 150b, of which schematic diagrams are illustrated in FIGS. 12 and 12A respectfully. FIG. 12 illustrates interconnection for d.c. activation of the solenoid coils in which a positive voltage is applied to each coil through a COMMon line. Each coil is connected to a negative line for activation of the coil when the negative line is pulled to ground. LED's 168, 170 are connected across respective coils through a current limiting resistor for illumination when voltage is applied to the associated coil. Arc suppression diodes 172, 174 are connected across each coil. FIG. 12A illustrates solenoid control board 150b for a.c. activation of the coils. Once again, the COMMon line is connected to both coils, which have respective separate return lines. LED's 168, 170 are connected across the respective coils through associated sets of series current-limiting resistors. LED's 168, 170 are positioned adjacent to the upper edge of assembly 150 as shown in FIG. 9. LED's 168, 170 are disposed in assembly beneath a clear window 180 on the outer wall of valve body 136 adjacent to indicia 182 for indicating to an operator which of the LED's is illuminated, and therefore which solenoid coil has been energized.

Figure 13:
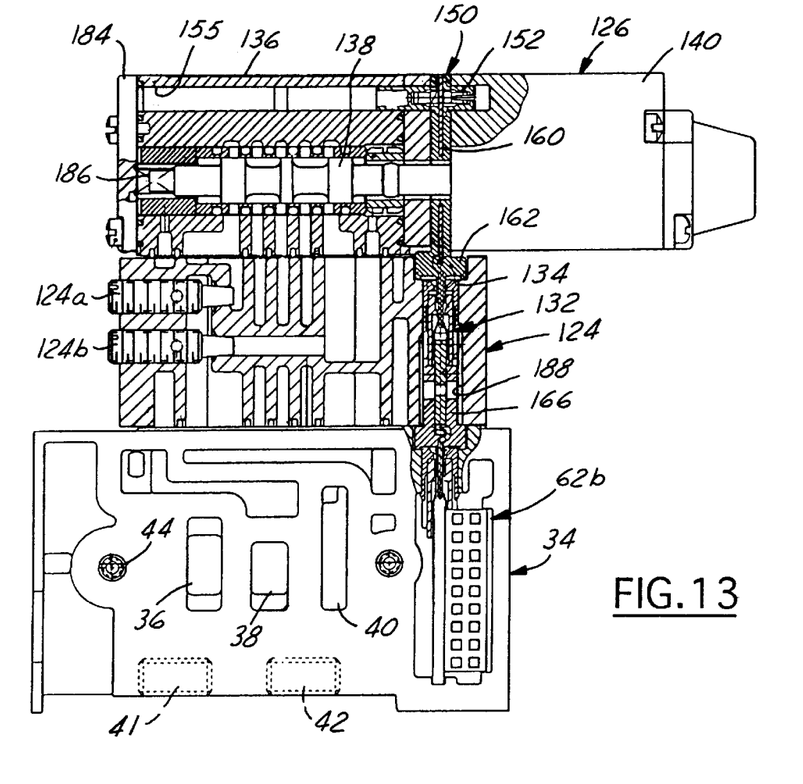
FIG. 13 is a partially sectioned elevational view of a manifold body/velocity control/single-solenoid valve arrangement in the system of FIG. 1.

FIG. 13 is similar to FIG. 8, but illustrates single-coil solenoid valve 126 coupled to its associated manifold body 34 through speed control module 124. Valve body 136 again has a passage within which spool 138 is disposed. Solenoid 140 is again mounted on one end of valve body 136, with solenoid control assembly 150 sandwiched therebetween. The opposing end of valve body 136 is enclosed by a cover plate 184, with a coil spring 186 being captured in compression between cover plate 184 and spool 138. Thus, in single-solenoid valve 126, solenoid 142 (FIG. 8) is replaced by coil spring 186, and solenoid interconnector 136 is deleted. Valve connector 132 is disposed within a passage 188 of speed control 124, interconnecting solenoid control 150 with manifold card 62b. Speed control 124 has the usual screws 124a and 124b for controlling air passage orifice size, and thereby controlling speed of operation of valve 126 and any equipment coupled thereto.

The purpose of providing manifold circuitboard 62 in two versions 62a, 62b will be clear. Version 62a illustrated in FIGS. 6A and 6B provide two control lines to connector 70a, thus being suitable for use in conjunction with a dual-solenoid valve 122, while version 62b provides a single valve control line to connector 70b, thus being suitable for use in conjunction with a single-solenoid valve. In both assemblies, contacts "1" and "10" of connector 66 is connected to contacts "1" and "10" of connector 68 and to one contact of connector 70a, thus providing the COMMon connection for the valve solenoids. This COMMon connection, connected to positive (or negative) d.c. potential, or to one side of a.c. potential, is connected in series throughout the manifold, providing a single common connection to all valve solenoids. Contacts "2" and "3" of connector 66 in circuitboard 62a are connected to the A and B contacts of connector 70a, while the remaining contacts of connector 66 are connected to correspondingly numbered contacts of connector 68 minus two. Thus, contacts "4" and "5" of connector 66 are connected by circuitboard 62a to contacts "2" and "3" of connector 68, thus being positioned for connection to the A and B contacts of connector 70a in the next manifold body. In the same way, assuming that there is a dual solenoid valve at each manifold section, contacts "6" and "7" of connector 66 in FIG. 6B are connected to contacts "4" and "5" of connector 68, and will be connected to contacts "2" and "3" in connector 68 in the next manifold section preparatory to connection to the A and B terminals of connector 70a in the third manifold section.

In contrast, within circuitboard 62b (FIGS. 7A and 7B) there is a decrement of only a single contact number between connectors 66 and 68 because only one line is required for energization of the single coil in the associated single-solenoid valve. Thus, in both embodiments 62a and 62b, the connector contact number is decremented at each manifold station in accordance with the number of solenoids in the associated valve. It will also be noted that manifold circuitboards 62a, 62b automatically accommodate mixing of solenoid valves, such as single-coil valve 126 and dual-coil valve 122. The valve control signal at contact "2" of connector 66 at the station at which single-coil valve 126 is disposed will provide the valve control signal to the valve solenoid, while contacts "3" and "4" are decremented by one in connection to contacts "2" and "3" of connector 68. At the next station at which dual-coil valve 122 is disposed, the control signals appearing at contacts "2" and "3" of connector 66 are fed as the A and B coil control signals to connector 70a of the manifold circuitboard 62a employed at that section. Thus, manifold circuitboards 62 (62a and 62b) automatically accommodate differing combinations of single—and dual-solenoid valves while appropriately decrementing the conductor contact at which valve control signals are provided. In the particular embodiment illustrated in which connectors 66, 68 comprise eighteen-pin connectors, sixteen single-valve solenoids or eight dual-valve solenoids, or combinations thereof, may thus be accommodated in a single manifold assembly.

It will also be noted that the three contacts (COMM, A and B) of connector 70 (70a or 70b) are directly interconnected by valve connector circuitboard 132 with the corresponding three contacts at input connector 164 of solenoid control circuitboard 150. In applications where no pressure regulator or speed control device is required, valve interconnection circuitboard 132 may be eliminated, and the valve mounted directly on the side face of the manifold body with connector 162 in mating engagement with connector 70 (70a or 70b). Connectors 162, 166 are dimensioned to seal opening 72 of manifold body 34, and the corresponding opening of pressure regulator 132 or speed control 124 (or any other intermediate device disposed between a manifold body and a solenoid valve).

Figures 14, 15:
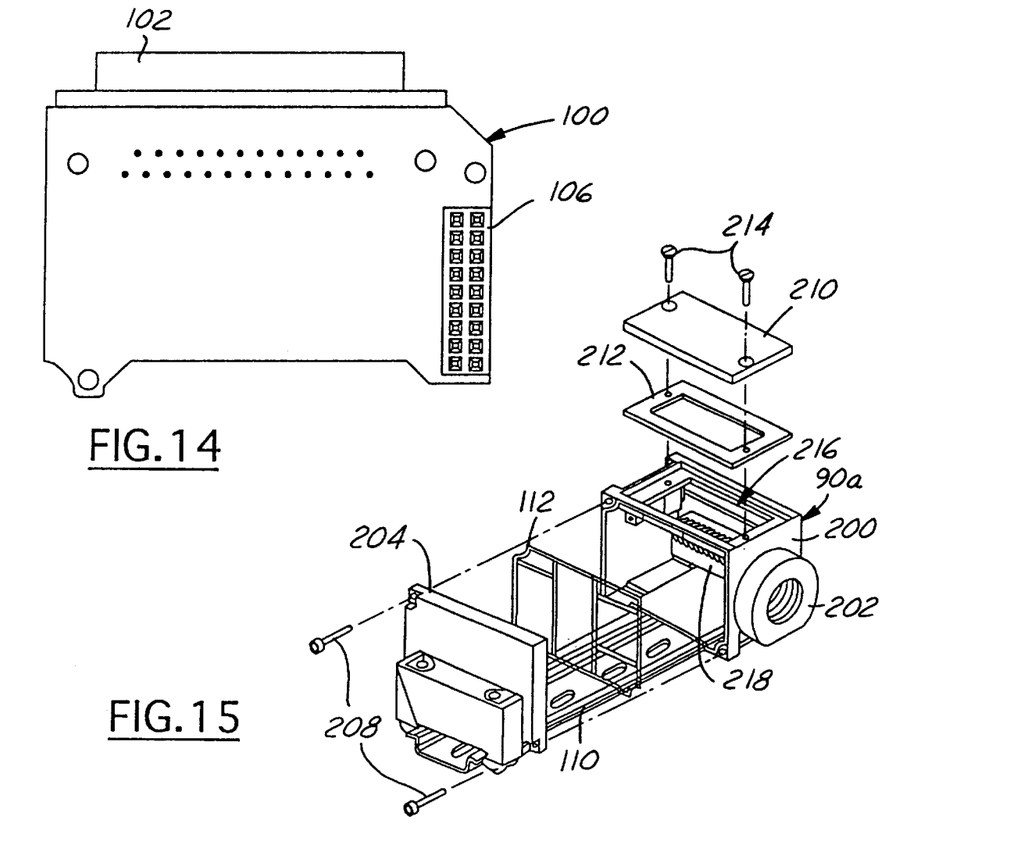
FIG. 14 is an elevational view of the input/output circuitboard in the system of FIG. 1.
FIG. 15 is a fragmentary exploded perspective view of an alternative input/output connection arrangement that can be employed in the system of FIG. 1.
Figure 16:
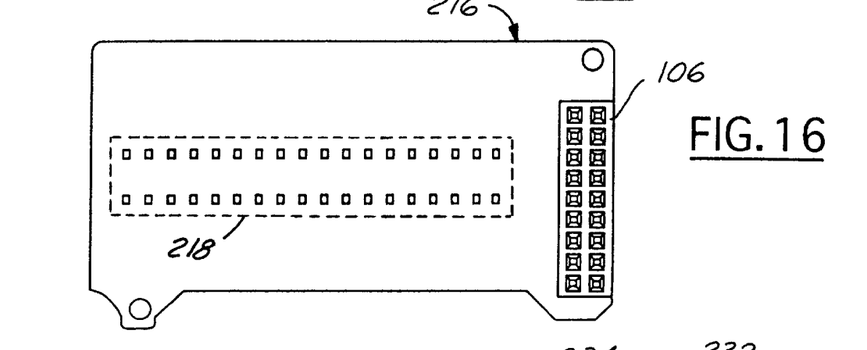
FIGS. 16 and 17 are elevation and plan views of the input/output circuitboard in the modified embodiment of FIG. 15.
Figure 17:
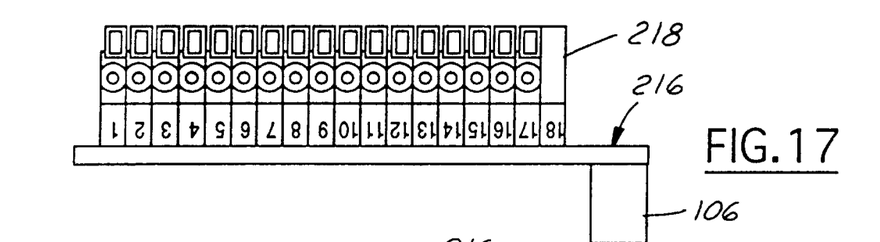

FIGS. 15–17 illustrate a modified end housing assembly 90a that may be employed in place of end housing assembly 90 in FIGS. 1 and 2. Basically, end housing assembly 90a comprises a shell 200 having an internally threaded gland 202 extending from one sidewall for receiving an interconnection cable connected to remote control electronics. An end plate 204 and a gasket 112 are adapted to be mounted to one end face of housing 200 by means of screws 208. Likewise, a top plate 210 and a gasket 212 are mounted on housing 200 by screws 214. Within housing 200, an input/output connector board 216 (FIGS. 15–17) is disposed. Connector 216 includes a terminal strip 218 having a plurality of screw-type or friction lock terminals for hard-wire connection of conductors extending through gland 202. The individual contacts of connector 218 are connected by conductors printed on circuitboard 216 to associated terminals or contacts of a connector 106 that is mounted along an edge of circuitboard 216 for alignment in assembly with manifold interconnection cards 62 (62a or 62b). Thus, end housing assembly 90a provides for hard-wire screw terminal connection of the input/output cable, in place of connection via connector 102 (FIGS. 1, 2 and 14) in the embodiment of FIGS. 1–14.

Figure 18:
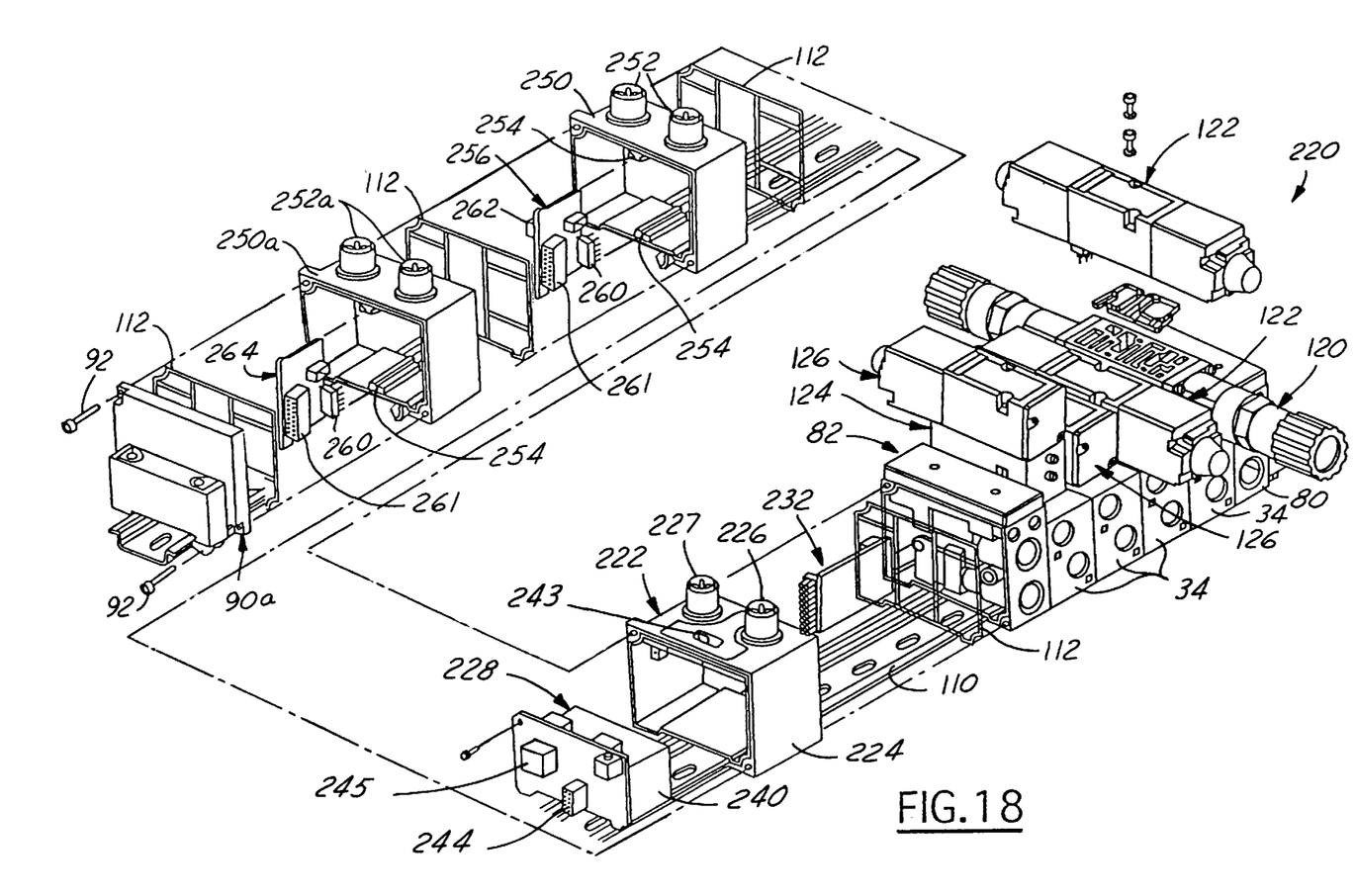
FIG. 18 is an exploded perspective view of a modified fluid control system.
Figure 19:
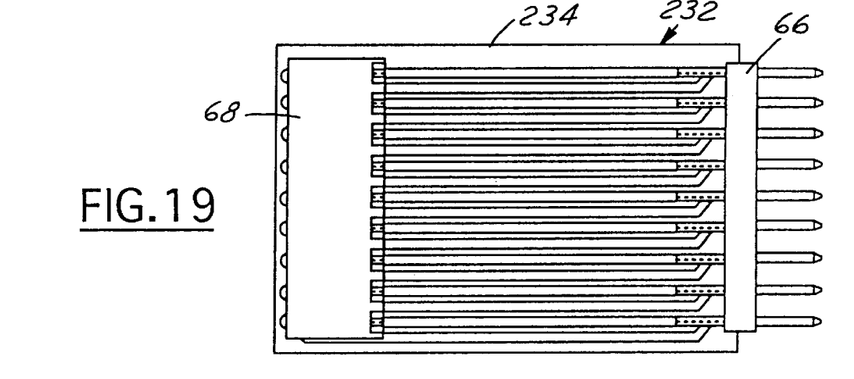
FIG. 19 is an elevational view of the signal transfer board assembly employed in the system of FIG. 18.
Figure 20:
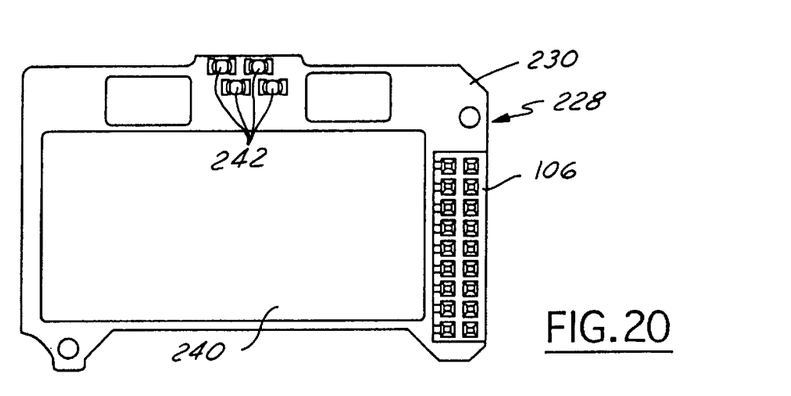
FIGS. 20 and 21 are elevational views of the input/output board assembly in the system of FIG. 18.
Figure 21:
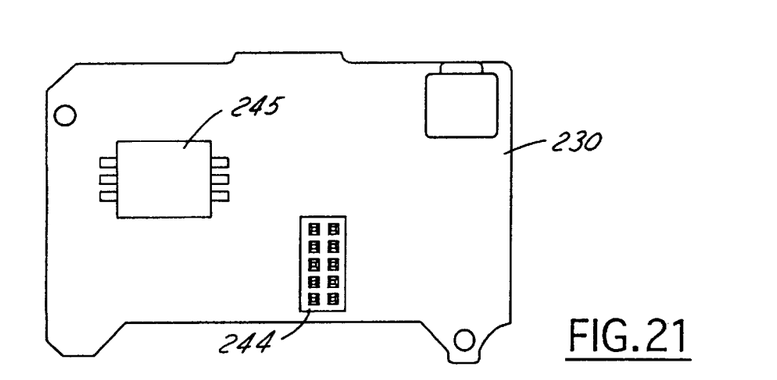

FIG. 18 illustrates a modified system 220, in which components identical to those illustrated in FIGS. 1–17 are indicated by correspondingly identical reference numerals, and components similar but not identical to those hereinabove described are indicated by identical reference numerals with a suffix. In the system of FIG. 18, there are four manifold bodies 34 disposed between end plate assemblies 80, 82. In addition to a dual-solenoid valve 122 mounted to a manifold body 34 by a pressure regulator 120 and a single-solenoid valve 126 mounted to a manifold body 34 by a speed control 124, the system of FIG. 18 also includes a dual-coil solenoid valve 122 and a single-coil solenoid valve 126 mounted directly to associated manifold bodies 34 without intervening hardware. As noted above, in these mounting arrangements, connector 162 of solenoid control circuitboard 150 is in direct mating engagement with connector 70 (70a or 70b) of manifold circuitboard 62 (62a or 62b). The end housing assembly 222 of FIG. 18 is specifically adapted for use in conjunction with bus-type electronic input/output with the external control apparatus. Specifically, housing 222 includes a first shell 224 having bus-type input/output connectors 226 and an auxiliary power connector 227 mounted thereon. An electronic bus interface assembly 228 (FIGS. 18–21) is disposed within housing 224. Interface electronics 228 includes a printed circuitboard 230 having a connector 106 along one edge for alignment and mating engagement with manifold circuitboards 62 by means of a transfer board 232 (FIGS. 18 and 19). Transfer board 232 comprises a circuitboard 234 having a male connector 66 and a female connector 68 at opposed ends, and conductors printed thereon directly interconnecting like or identical contacts of connectors 66, 68. Thus, transfer board 232 connects the contacts of connector 106 on input/output board 228 with manifold boards 62 in sequence. Input/output board 228 also includes an electronic assembly 240 suitable for communication by means of a selected protocol, differing input/output boards 228 thus being adapted for use in conjunction with differing protocols. LED's 242 along the upper edge of assembly 228 cooperate with a window 243 in shell 224 to indicate pendency of communication, while a connector 244 on the back face of circuitboard 230 provides for connection to master and slave input/output electronic interfaces, as will be described. Input/output assembly 228 may include additional electronics, such as valve driver circuits 245 (FIG. 21), for converting input/output commands from a remote source into signals suitable for operating the several solenoid valves 122, 126 in the desired manner.

Figure 22:
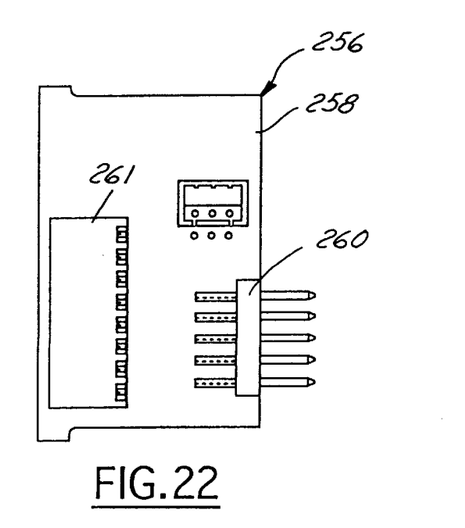
FIGS. 22 and 23 are elevational views of a master input/output board assembly in the embodiment of FIG. 18.
Figure 23:
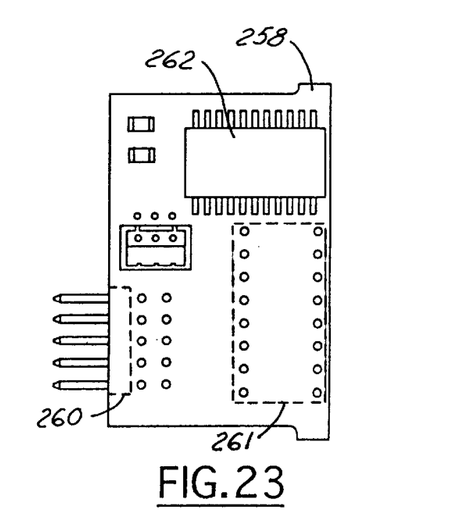
Figure 24:
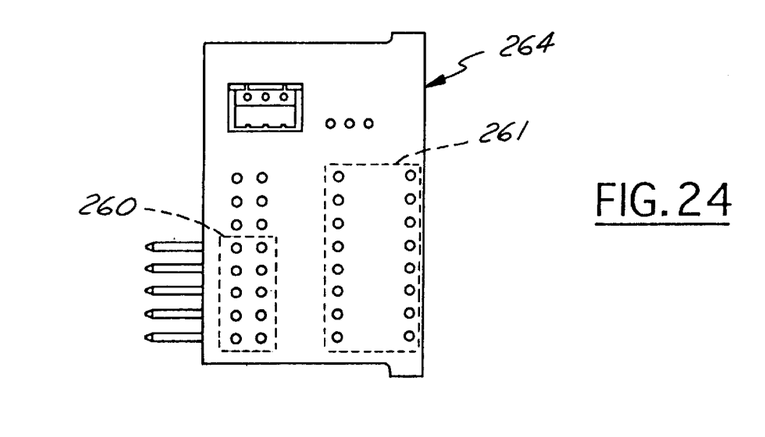
FIG. 24 is an elevational view of an input/output slave board assembly in the embodiment of FIG. 18.

System 220 further includes facility for operating additional manifold assemblies in a master/slave technique. A second input/output housing shell 250 has a pair of input/output bus-type connectors 252 mounted thereon. Housing shell 250 is mounted against housing shell 224, with a gasket 112 sandwiched therebetween. A pair of laterally opposed slots 254 within housing shell 252 received opposed side edges of a master input/output card 256 (FIGS. 8, 22 and 23). Card 256 includes a circuitboard 258 on which a connector 260 is mounted for mating engagement with connector 244 on input/output board 228. An input/output driver chip 262 on board 258 provides for transmission of control signals as inputs or outputs through one or both connectors 252. Driver chip 262 is capable of up to eight input/output connections, of which two are at 252. For up to six additional input/output connections, additional shells 250a (only one being shown in FIG. 18) are mounted to shell 250, and the associated input/output connectors 252a are connected to driver chip 262 by slave boards 264 (FIGS. 18 and 24). Slave board 264 is identical to master board 256, except that driver chip 262 is deleted. Connector 260 on slave board 264 mates with connector 261 on master board 256. Up to three shells 250a, three slave boards 264 and six connectors 252a may be connected to driver 262 on master board 256 in this manner. Further master and slave boards may be added in the same manner for additional input/output capability.

What is claimed is:

1. A fluid control system that comprises:
   a fluid manifold having a plurality of manifold bodies fastened to each other end-to-end so as to form fluid passage means extending through said manifold, said manifold bodies including first through passage means that align with each other and collectively form said fluid passage means in said manifold, and second through passage means that align with each other and collectively form a continuous second passage through said manifold parallel to and offset from said fluid passage means,
   a solenoid valve mounted on a side of at least one of said manifold bodies with fluid ports opening into said body to said fluid passage means,
   electrical connection means mounted at one end of said manifold for receiving control signals from an external source, and
   a plurality of individual circuitboards disposed one in each of said second through passage means, said plurality of circuitboards having interconnection means and conductors printed thereon, and being electrically interconnected in series through said continuous second passage, by means of said interconnection means and said conductors, electrically connecting said connection means to said solenoid valve.

2. The system set forth in claim 1 wherein said interconnection means comprising female interconnection means at one end of each said circuitboard and mating male interconnection means at an opposing end of each said circuitboard for enabling said series connection of said circuitboards through said continuous second passage.

3. The system set forth in claim 2 wherein each of said circuitboards further includes third electrical interconnection means on a lateral side thereof adjacent to said side of said manifold body for electrical interconnection of said circuitboard to said solenoid valve mounted on said side of said body.

4. The system set forth in claim 3 wherein said second passage means includes a slot extending at least partway through said body for slidably receiving and retaining said circuitboard.

5. The system set forth in claim 4 wherein said third electrical interconnection means includes an opening in said body extending from said second through passage means to said side of said body, and an electrical connector disposed in said opening for electrical connection to said circuitboard by mating engagement with said third electrical interconnection means on said circuitboard.

6. The system set forth in claim 5 adapted for use in conjunction with single-solenoid and dual-solenoid valves mounted on said body, wherein said connector is color-coded to identify said circuitboard for use with either a single-solenoid or a dual-solenoid valve.

7. The system set forth in claim 3 wherein each said circuitboard has at least one first conductor printed thereon that extends from a preselected contact of said male connector to the same preselected contact of said female connector so as to extend continuously through said manifold and supply a common connection to all valves on said manifold, and a plurality of second conductors at least one of which extends to said third connector and the remainder of which extend from corresponding contacts of one of said male and female connectors to a contact on the other of said male and female connectors reduced as compared with said corresponding contacts by the number of said second conductors that connect to said third connector.

8. The system set forth in claim 7 for use in conjunction with single-solenoid and dual-solenoid valves mounted on said body, wherein said circuitboard has either one of said second conductors extending to said third connector for use in conjunction with single-solenoid valves or two of said second conductors extending to said third connector for use in conjunction with dual-solenoid valves.

9. The system set forth in claim 3 wherein said solenoid valve comprises a valve body mounted on said manifold body with valve ports coupled to said first passage means, a solenoid mounted to said valve body and operatively coupled to a valve element in said valve body, and valve circuitboard means sandwiched between said solenoid and said valve body, said valve circuitboard means including first valve connection means for interconnection with said third connector and second valve connection means for connection to said solenoid and thereby operatively interconnecting said solenoid to said third connector.

10. The system set forth in claim 9 wherein said solenoid has connector means for mating engagement with said second valve connection means on said valve circuitboard means when said valve circuitboard means is sandwiched between said solenoid and said valve body.

11. The system set forth in claim 10 wherein said solenoid valve comprises a dual-solenoid valve having a second solenoid mounted at an opposing end of said valve body, and solenoid interconnection means extending through a passage within said valve body from said valve circuitboard to the connection means on said second solenoid thereby operatively interconnecting said second solenoid to said third connector.

12. The system set forth in claim 11 wherein said solenoid interconnection means is adapted for releasable mating engagement with said second solenoid and with said valve circuitboard such that said second solenoid may be disconnected from said valve body and said solenoid interconnection means and said valve body and said solenoid interconnection means may be disconnected from said solenoid and said valve circuitboard.

13. The system set forth in claim 10 wherein said connector means on said solenoid is adapted for releasable mating engagement with said valve circuitboard such that said solenoid may be disconnected from said valve circuitboard and said valve body.

14. The system set forth in claim 9 further comprising fluid control means mounted between said valve body and said side of said manifold body, and valve interconnection means extending through said fluid control means between said third connectors and said first valve interconnection means.

15. The system set forth in claim 14 wherein said valve interconnection means is adapted for releasable mating engagement with said third connector and said first valve interconnection means such that said solenoid valve may be disconnected from said fluid control means and said fluid control means may be disconnected from said body.

16. The system set forth in claim 9 wherein said first valve interconnection means is adapted for releasable mating engagement with said third connector.

17. The system set forth in claim 9 wherein said solenoid valve further comprises indicator means on said valve circuitboard means and visible from outside of said valve body for indicating energization of said solenoid.

18. The system set forth in claim 1 further comprising means on each of said bodies for fastening said bodies to each other.

19. The system set forth in claim 18 wherein said fastening means comprises at least one screw carried by each of said bodies having a male end and a female end for receiving the male end of the at least one screw in the adjacent body.

20. The system set forth in claim 19 further comprising a gasket on each said body for sealing engagement with the adjacent body for sealingly surrounding said first through passage means.

21. The system set forth in claim 1 wherein said bodies are identical.

22. The system set forth in claim 1 wherein said electrical connection means comprises a circuitboard assembly having first connection means for connection to the external source and second connection means for connection to said circuitboards.

23. The system set forth in claim 22 wherein said first connection means comprises terminal strip means for hardwire connection to the external source.

24. The system set forth in claim 22 for communication with the external source in accordance with a predetermined input/output protocol, wherein said first connection means is of a configuration coordinated with said predetermined input/output protocol.

25. The system set forth in claim 22 wherein said circuitboard assembly includes electronic circuit means for communication with the external source.

26. The system set forth in claim 25 wherein said electronic circuit means includes valve driver circuit means responsive to control signals from the external source for feeding valve solenoid control signals to said solenoid valve through said circuitboards.

27. The system set forth in claim 22 wherein said circuitboard assembly includes electronic circuit means for driving multiple input/output connector means.

28. The system set forth in claim 27 including a shell mounted to said manifold and having a predetermined number of input/output connectors thereon, and wherein said circuitboard assembly includes master circuitboard means having an input/output driver with plural input/output capability connected to said input/output connectors.

29. The system set forth in claim 28 including a plurality of said shells and associated input/output connectors mounted in series to said manifold, said master circuitboard means being mounted within one of said shells and connected to the associated connectors, and slave circuitboard means being mounted in the other of said shells and connecting said driver with the connectors on said shells.

30. The system set forth in claim 1 comprising a plurality of said solenoid valves mounted on associated ones of said bodies.

31. A fluid control system that comprises:
a fluid manifold having a plurality of manifold bodies fastened to each other end-to-end so as to form first passage means and second passage means parallel to and offset from each other and extending continuously through said manifold and each of said bodies,
a plurality of solenoid valves each mounted on a side of an associated body with valve ports opening into said body to said first passage means,
electrical connector means mounted at one end of said manifold for receiving valve control signals from an external source, and
a plurality of circuitboards disposed one within the second passage means of each body, each said circuitboard including male and female connection means at opposed ends connecting said circuitboards in series with each other to said electrical connector means, and third connection means extending laterally from each circuitboard for connection to the valve mounted on the side of the associated body.

32. The system set forth in claim 31 wherein each said circuitboard has at least one first conductor printed thereon that extends from a preselected contact of said male connector to the same preselected contact of said female connector so as to extend continuously through said manifold and supply a common connection to all valves on said manifold, and a plurality of second conductors at least one of which extends to said third connector and the remainder of which extend from corresponding contacts of one of said male and female connectors to a contact on the other of said male and female connectors reduced as compared with said corresponding contacts by the number of said second conductors that connect to said third connector.

33. The system set forth in claim 32 for use in conjunction with single-solenoid and dual-solenoid valves mounted on said body, wherein each said circuitboard has either one of said second conductors extending to said third connector for use in conjunction with single-solenoid valves or two of said second conductors extending to said third connector for use in conjunction with dual-solenoid valves.

34. The system set forth in claim 31 wherein each said solenoid valve comprises a valve body mounted on said manifold body with valve ports coupled to said first passage means, a solenoid mounted to said valve body and operatively coupled to a valve element in said valve body, and valve circuitboard means sandwiched between said solenoid and said valve body, said valve circuitboard means including first valve connection means for interconnection with said third connector and second valve connection means for connection to said solenoid and thereby operatively interconnecting said solenoid to said third connector.

35. The system set forth in claim 34 wherein said solenoid has connector means for mating engagement with said second valve connection means on said valve circuitboard means when said valve circuitboard means is sandwiched between said solenoid and said valve body.

36. The system set forth in claim 35 wherein at least one of said solenoid valves comprises a dual-solenoid valve having a second solenoid mounted at an opposing end of said valve body, and solenoid interconnection means extending through a passage within said valve body from said valve circuitboard to the connection means on said second solenoid thereby operatively interconnecting said second solenoid to said third connector.

37. The system set forth in claim 34 further comprising fluid control means mounted between said valve body and said side of said manifold body, and valve interconnection means extending through said fluid control means between said third connector and said first valve interconnection means.

38. The system set forth in claim 31 further comprising means on each of said bodies for fastening said bodies to each other.

39. The system set forth in claim 38 wherein said bodies are identical.

* * * * *